(12) United States Patent
Qiu

(10) Patent No.: US 11,281,661 B2
(45) Date of Patent: Mar. 22, 2022

(54) BLOCKCHAIN-BASED DATA PROCESSING METHOD AND DEVICE

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/561,288

(22) Filed: Sep. 5, 2019

(65) Prior Publication Data

US 2019/0391973 A1    Dec. 26, 2019

Related U.S. Application Data

(63) Continuation of application No. PCT/CN2018/086280, filed on May 10, 2018.

(30) Foreign Application Priority Data

May 12, 2017 (CN) .......................... 201710335973.4

(51) Int. Cl.
  *G06F 16/23* (2019.01)
  *G06F 16/27* (2019.01)
  *G06F 16/245* (2019.01)
  *G06F 16/22* (2019.01)

(52) U.S. Cl.
  CPC ...... *G06F 16/2379* (2019.01); *G06F 16/2255* (2019.01); *G06F 16/245* (2019.01); *G06F 16/27* (2019.01)

(58) Field of Classification Search
  None
  See application file for complete search history.

(56) References Cited

U.S. PATENT DOCUMENTS 7,770,008 B2    8/2010  Walmsley
10,423,938 B1*  9/2019  Gaeta ............... G06K 19/06037
(Continued)

FOREIGN PATENT DOCUMENTS

CN    101009703    8/2007
CN    103036696    4/2013
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Kris E Mackes
*Assistant Examiner* — Soheila (Gina) Davanlou
(74) *Attorney, Agent, or Firm* — Fish & Richardson P.C.

(57) ABSTRACT

A blockchain node obtains first service data. An attribute value of the first service data is determined, where the attribute value is used to represent uniqueness of the first service data. The blockchain node determines whether the first service data has been processed based on stored attribute values of second service data that has been processed and the attribute value of the first service data. In response to determining that the first service data has not been processed, the blockchain node processes the first service data.

15 Claims, 3 Drawing Sheets

(56) References Cited

U.S. PATENT DOCUMENTS

| | | | |
|---|---|---|---|
| 2004/0203615 A1* | 10/2004 | Qu | H04W 4/06 455/412.1 |
| 2007/0266037 A1* | 11/2007 | Terry | G06F 3/0607 |
| 2011/0158410 A1 | 6/2011 | Falk et al. | |
| 2011/0320347 A1* | 12/2011 | Tumminaro | G06Q 20/0855 705/39 |
| 2013/0042111 A1 | 2/2013 | Fiske | |
| 2015/0324789 A1 | 11/2015 | Dvorak et al. | |
| 2016/0027229 A1* | 1/2016 | Spanos | G07C 13/00 705/51 |
| 2016/0330027 A1* | 11/2016 | Ebrahimi | H04L 9/3066 |
| 2016/0342977 A1* | 11/2016 | Lam | G06Q 20/02 |
| 2016/0342994 A1 | 11/2016 | Davis | |
| 2017/0048235 A1 | 2/2017 | Lohe et al. | |
| 2017/0132621 A1 | 5/2017 | Miller et al. | |
| 2017/0132626 A1 | 5/2017 | Kennedy | |
| 2019/0095909 A1* | 3/2019 | Wright | G06F 21/602 |

FOREIGN PATENT DOCUMENTS

| | | |
|---|---|---|
| CN | 105931052 | 9/2016 |
| CN | 106131048 | 11/2016 |
| CN | 106156050 | 11/2016 |
| CN | 106295401 | 1/2017 |
| CN | 106530083 | 3/2017 |
| CN | 106650494 | 5/2017 |
| EP | 2741227 | 6/2014 |
| JP | 2004532468 | 10/2004 |
| KR | 20170033788 | 3/2017 |
| WO | WO 2014196181 | 12/2014 |
| WO | WO 2016204572 | 12/2016 |
| WO | WO 2017006136 | 1/2017 |
| WO | WO 2017079214 | 5/2017 |
| WO | WO 2017079652 | 5/2017 |
| WO | WO 2018205971 | 11/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/086280, dated Jul. 27, 2018, 8 pages (with partial English Translation).

Cecchetti et al., "Solidus: Confidential Distributed Ledger Transactions via PVORM," International Association for Cryptologic Research, Apr. 2017, 1:1-27.

Extended European Search Report in European Application No. 18799071.8, dated Nov. 4, 2019, 10 pages.

Miller et al., "The Honey Badger of BFT Protocols," International Association for Cryptologic Research, Feb. 2016, 1:1-21.

PCT International Preliminary Report on Patentability in International Application. No. PCT/CN2018/086280, dated Nov. 12, 2019, 7 pages (with English translation).

Snow et al., Brave NewCoin.com [online], "Factom Ledger by Consensus," Feb. 2015, retrieved on Nov. 4, 2019, retrieved from URL<https://bravenewcoi n.com/assets/Whi tepapers/ FactomLedgerbyConsensus.pdf>, 28 pages.

Cecchetti et al., "Solidus: Confidential Distributed Ledger Transactions via PVORM," IACR, International Association for Cryptologic Research, Apr. 10, 2017, 23 pages.

factom.com [online], "Factom Ledger by Consensus," Jan. 17, 2015, retrieved on Aug. 17, 2020, retrieved from URL<https:// factomize.com/uploads/FactomLedgerbyConsensus.pdf>, 28 pages.

Miller et al., "The Honey Badger of BFT Protocols," IACR, International Association for Cryptologic Research, Feb. 24, 2016, 15 pages.

Antonopoulos, "Mastering Bitcoin: Unlocking Digital Cryptocurrencies", NHK Publishing, Inc., Jul. 21, 2016, 9 pages (with English abstract).

Cecchetti et al. [online], "Solidus: Confidential Distributed Ledger Transactions via PVORM", Cryptology ePrint Archive, Oct. 30, 2017, retrieved on Sep. 8, 2020, retrieved from URL<https://eprint. iacr.org/2017/317/20170831:160538>, 24 pages.

* cited by examiner

BLOCKCHAIN-BASED DATA PROCESSING METHOD AND DEVICE

CROSS-REFERENCE TO RELATED APPLICATIONS

This application is a continuation of PCT Application No. PCT/CN2018/086280, filed on May 10, 2018, which claims priority to Chinese Patent Application No. 201710335973.4, filed on May 12, 2017, and each application is hereby incorporated by reference in its entirety.

TECHNICAL FIELD

The present application relates to the field of Internet information processing technologies and computer technologies, and in particular, to a blockchain-based data processing method and device.

BACKGROUND

A blockchain technology is also referred to as a distributed ledger technology, and is a distributed Internet database technology. A network constructed based on the blockchain technology can be referred to as a blockchain network, and the blockchain network includes network nodes (which can also be referred to as blockchain nodes, and are referred to as nodes for short in the following). Each node corresponds to at least one blockchain, and each blockchain includes at least one block. The blockchain network (or the blockchain technology) is decentralized, transparent, trustable, and cannot be tampered with. Based on these characteristics, the blockchain technology is more and more widely applied.

With the development of blockchain technology, a replay attack technology can occur in practice. The replay attack technology means that a malicious user illegally obtains service data that is being processed by a blockchain network or service data that has been processed by a blockchain network, and resends the service data to the blockchain network, so that the blockchain network reprocesses the service data. For example, assume that service data obtained by using the replay attack technology is "transferring 100 yuan from an account A to an account B". If the account A has 300 yuan, when service data sent by a user corresponding to the account A is received, the transaction data is processed, and then the account A has 200 yuan left. Because the malicious user obtains the service data by using the replay attack technology, the blockchain network also processes the service data after receiving the service data sent by the malicious user, and then the A account has 100 yuan left. It can be seen that the replay attack technology threatens data security of the blockchain network.

To prevent a replay attack, Ethereum configures a random number for each account. When service data is generated in the account, the random number is automatically increased by 1 to obtain a value, and both the value and the service data are sent to a blockchain node. Therefore, when receiving the service data, the blockchain node can perform verification on the service data by using the value. The blockchain node processes the service data in response to determining that the service data is not a repeated transaction; otherwise, discards processing of the service data.

However, to ensure that a random number can continuously increase with generated service data, when one of two pieces of service data generated in a same account is sent to the blockchain node, the random number needs to be locked, and the random number can be unlocked when the service data is processed. In other words, when such the method is used to prevent the replay attack, the service data is processed in a serial mode, and consequently service data processing efficiency in the blockchain network is relatively low.

SUMMARY

In view of this, implementations of the present application provide a blockchain-based data processing method and device, so as to alleviate a problem of how to prevent a replay attack in a blockchain network to improve an overall throughput of blockchain transaction data processing.

The following technical solutions are used in the implementations of the present application:

An implementation of the present application provides a blockchain-based data processing method, including the following: obtaining, by a blockchain node, first service data, and determining an attribute value of the first service data, where the attribute value is used to represent uniqueness of the first service data; determining, by the blockchain node based on stored attribute values of second service data that has been processed and the attribute value of the first service data, whether the first service data has been processed; and processing, by the blockchain node, the first service data in response to determining that the first service data has not been processed.

An implementation of the present application further provides a blockchain-based data processing device, including the following: an acquisition unit, configured to obtain first service data, and determine an attribute value of the first service data, where the attribute value is used to represent uniqueness of the first service data; a determining unit, configured to determine, based on stored attribute values of second service data that has been processed and the attribute value of the first service data, whether the first service data has been processed; and a processing unit, configured to process the first service data in response to determining that the first service data has not been processed.

The previously described at least one technical solution used in the implementations of the present application can achieve the following beneficial effects:

In the implementations of the present application, an attribute value that can represent uniqueness of service data to be processed is compared with an attribute value, stored in a blockchain node, of service data that has been processed, to determine whether the service data to be processed has been processed; and when it is determined that the service data to be processed has not been processed, processing of the service data to be processed is started. Therefore, a replay attack can be effectively prevented. In addition, because attribute values of different service data are different, a problem that other service data cannot be processed due to the locking of one service data that is being processed can be avoided. Therefore, service data processing efficiency in a blockchain network is effectively ensured, and an overall service data throughput in the blockchain network is increased.

BRIEF DESCRIPTION OF DRAWINGS

The accompanying drawings described here are intended to provide a further understanding of the present application, and constitute a part of the present application. The illustrative implementations of the present application and descriptions of the implementations of the present application are intended to describe the present application, and do not constitute limitations on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations of the present application and corresponding accompanying drawings. Apparently, the described implementations are some rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

Figure 1:
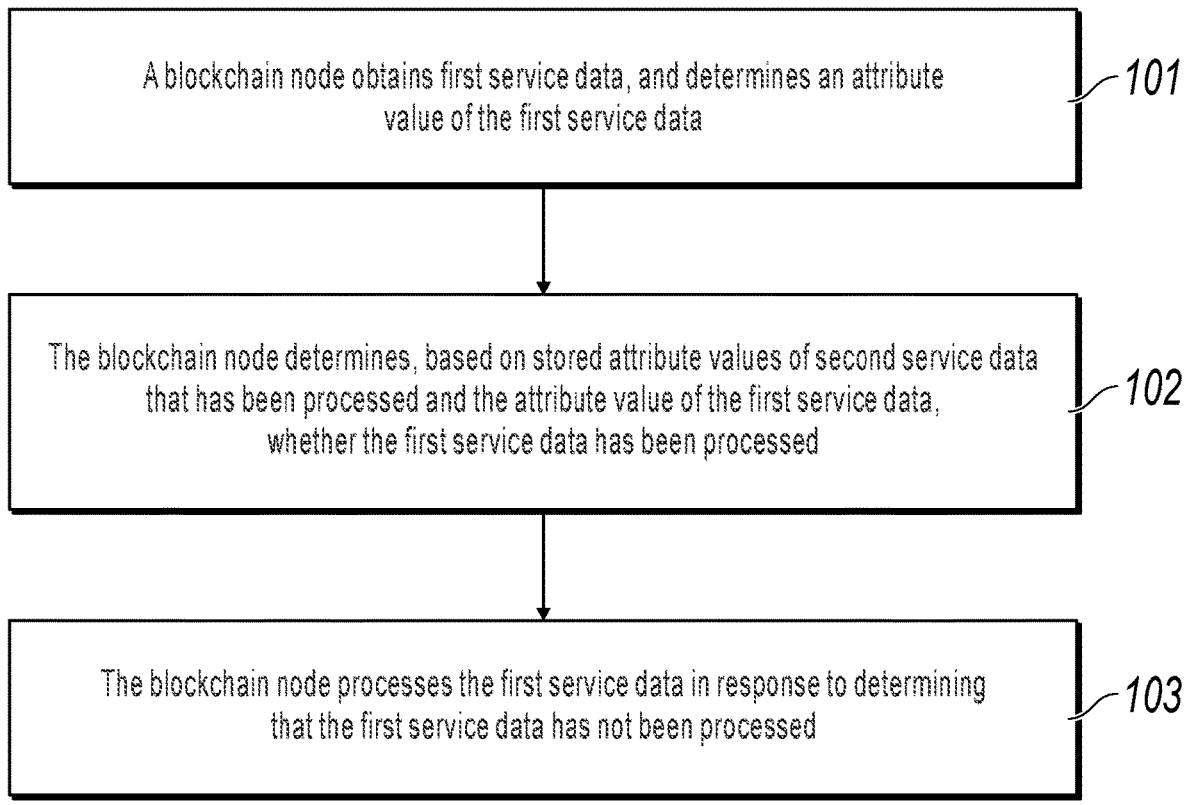
FIG. 1 is a schematic flowchart illustrating a blockchain-based data processing method, according to an implementation of the present application.

FIG. 1 is a schematic flowchart illustrating a blockchain-based data processing method, according to an implementation of the present application. The method can be described as follows:

Step 101: A blockchain node obtains first service data, and determines an attribute value of the first service data.

The attribute value is used to represent uniqueness of the first service data.

In this implementation of the present application, when receiving a service processing request sent by another device, the blockchain node can obtain service data from the service processing request. The service data here can be considered as the first service data.

In addition, before triggering a consensus operation, the blockchain node can obtain a predetermined amount of service data from a plurality of pieces of stored service data. The service data here can be considered as a plurality of pieces of first service data. A specific implementation of obtaining the first service data is not limited here.

It is worthwhile to note that the blockchain node can be a processing node of service data, or can be a non-processing node of service data. The processing node can be understood as a node that directly receives the service data from another device, and the non-processing node can be understood as a node that receives the service data from another blockchain node through broadcast. In other words, for one piece of service data, a blockchain network possibly includes one processing node and a plurality of non-processing nodes.

When obtaining the first service data, the blockchain node can determine the attribute value of the first service data. The attribute value here is obtained when the service data is generated. If the service data is transaction data, when the transaction data is generated, a serial number of the transaction data is also generated, and the serial number can be used as an attribute value of the transaction data, namely, the attribute value described in this implementation of the present application. In addition, when the service data is generated, the generated transaction data can be further calculated by using a predetermined algorithm, and an obtained calculation result can be considered as the attribute value of the service data. For example, the generated service data is calculated by using a hash algorithm, and an obtained hash value is the attribute value of the service data.

The attribute value described in this implementation of the present application includes one or more of a hash value of the service data and a serial number of the service data.

It is worthwhile to note that in this implementation of the present application, because the attribute value can uniquely identify the service data, the attribute value can be used as a condition for identifying whether the service data is unique.

To ensure security of the attribute value of the service data, the attribute value can be encrypted. This is not specifically limited here.

Step 102: The blockchain node determines, based on stored attribute values of second service data that has been processed and the attribute value of the first service data, whether the first service data has been processed.

In this implementation of the present application, when processing service data, the blockchain node stores an attribute value of service data that has been processed. That is, in the technical solution provided in this implementation of the present application, the blockchain node needs to maintain a database, and the database stores an attribute value of service data that has been processed by the blockchain node. As such, when a replay attack occurs, whether service data to be processed is repeatedly processed can be determined by using the attribute value, stored in the database, of the service data that has been processed. In addition, a problem in the existing technology that other service data cannot be processed due to the locking of one service data that is being processed can be avoided. Although it is slightly redundant in space, system performance and processing time can be improved. Therefore, service data processing efficiency in a blockchain network is effectively ensured, and an overall service data throughput in the blockchain network is increased.

Specifically, the blockchain node queries, in the stored attribute values of the second service data that has been processed, for whether there is an attribute value that is the same as the attribute value of the first service data.

The blockchain node determines, based on a query result, whether the first service data has been processed.

For example, the blockchain node compares the stored attribute values of the second service data that has been processed with the attribute value of the first service data, to determine whether there is an attribute value that is the same as the attribute value of the first service data in the attribute values of the second service data that has been processed.

If there is an attribute value that is the same as the attribute value of the first service data in the attribute values of the second service data that has been processed, it indicates that the first service data has been processed, and it can be further determined that the first service data is invalid service data, and is possibly a replay attack. If there is no attribute value that is the same as the attribute value of the first service data in the attribute values of the second service data that has been processed, it indicates that the first service data has not been processed.

It is worthwhile to note that in a replay attack technology, when service data (which is subsequently referred to as valid service data) is intercepted or stolen, the service data is replicated, to generate other service data (which is subsequently referred to as invalid service data) that is the same as the intercepted service data. It indicates that an attribute value of the valid service data is the same as that of the invalid service data.

In addition, "first" and "second" in "first service data" and "second service data" described in this implementation of the present application indicate no special meaning, and are merely used to distinguish between different service data.

Step 103: The blockchain node processes the first service data in response to determining that the first service data has not been processed.

In this implementation of the present application, once determining that the first service data has not been processed, the blockchain node can process the first service data, in other words, perform consensus processing, storage processing, etc. on the service data.

If the blockchain node is a processing node of the first service data, in response to determining that the first service data has not been processed, the blockchain node can further broadcast the first service data to another blockchain node in the blockchain network by using a method in the existing technology after processing the first service data.

Specifically, the determining, by the blockchain node, that the first service data has not been processed includes the following: determining, by the blockchain node, that the first service data has not been processed in response to determining that no attribute value is found to be the same as the attribute value of the first service data from the stored attribute values of the second service data that has been processed.

Preferably, in this implementation of the present application, the method further includes the following: storing, by the blockchain node, the attribute value of the first service data.

As described above, the blockchain node can maintain a database (which is subsequently referred to as a processed database), and the processed database stores attribute values of service data that has been processed. The blockchain node can store the attribute value of the first service data in the processed database.

It is worthwhile to note that the processed database described in this implementation of the present application can be a relational database, or can be a Key-Value database. This is not specifically limited here.

Preferably, when storing the attribute value of the first service data in the processed database, the blockchain node can further determine a query index for the attribute value of the first service data, and further establish a mapping relationship between the query index and the attribute value of the first service data. This helps to improve execution efficiency of step 102, and further improve service data processing performance in the entire system.

Preferably, in this implementation of the present application, the method further includes the following: discarding, by the blockchain node, processing of the first service data in response to determining that the first service data has been processed.

It is worthwhile to note that the technical solution in this implementation of the present application can be triggered and executed when the blockchain node (which refers to a processing node here) receives a service processing request, or can be executed before a consensus is triggered. A real-time timing is not specifically limited here, and can be determined based on an actual need.

If the previously described solution is executed before the consensus is triggered, it means that whether received service data has been processed needs to be identified before the consensus is started regardless of a processing node or a non-processing node, and the previously described processed database can be accessed by any blockchain node in the blockchain network, in other words, is a database that is shared in the blockchain network. Moreover, if the blockchain node is a processing node, in response to determining that the first service data has been processed, the blockchain node broadcasts information that the first service data has been processed to another blockchain node, so that the other blockchain node can also discard processing of the first service data. The processing here can be consensus processing, storage processing, etc.

According to the technical solution in this implementation of the present application, an attribute value that can represent uniqueness of service data to be processed is compared with an attribute value, stored in a blockchain node, of service data that has been processed, to determine whether the service data to be processed has been processed; and when it is determined that the service data to be processed has not been processed, processing of the service data to be processed is started. Therefore, a replay attack can be effectively prevented. In addition, because attribute values of different service data are different, a problem that other service data cannot be processed due to the locking of one service data that is being is processed can be avoided. Therefore, service data processing efficiency in a blockchain network is effectively ensured, and an overall service data throughput in the blockchain network is increased.

Figure 2:
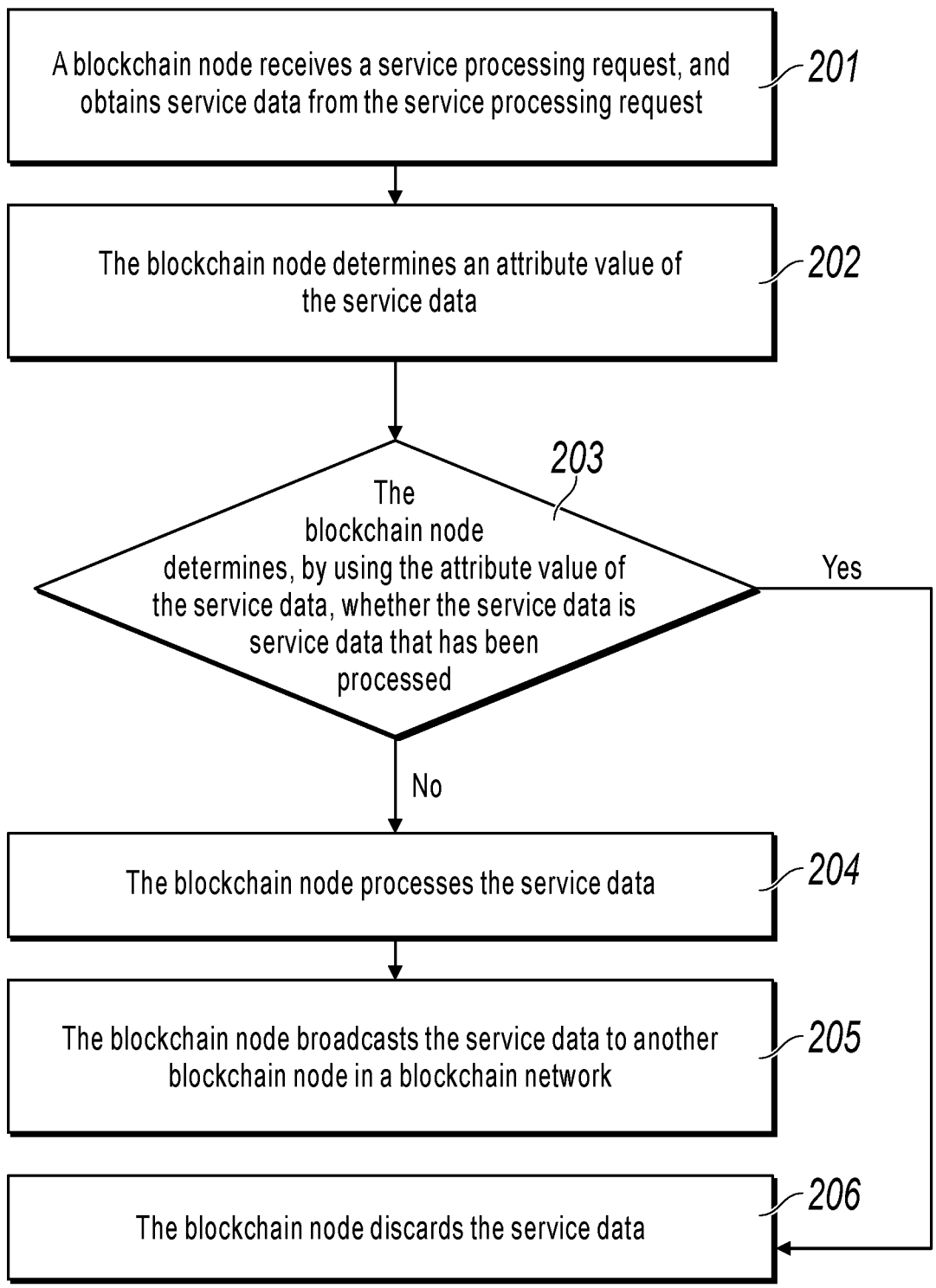
FIG. 2 is a schematic flowchart illustrating a blockchain-based data processing method, according to an implementation of the present application.

Based on the same inventive concept, FIG. 2 is a schematic flowchart illustrating a blockchain-based data processing method, according to an implementation of the present application. The method can be described as follows. In this implementation of the present application, an example in which execution of this solution is triggered when a blockchain node receives a service processing request is used for description.

Step 201: A blockchain node receives a service processing request, and obtains service data from the service processing request.

Step 202: The blockchain node determines an attribute value of the service data.

The attribute value here can be a serial number of the service data, a hash value of the service data, etc. This is not specifically limited.

Step 203: The blockchain node determines, by using the attribute value of the service data, whether the service data is service data that has been processed; and if it is determined that the service data is the service data that has not been processed, performs step 204, otherwise, performs step 206.

In this implementation of the present application, that the blockchain node determines whether the service data is service data that has been processed includes but is not limited to the following: determining, by the blockchain node based on stored attribute values of second service data that has been processed and an attribute value of first service data, whether the first service data has been processed.

For a specific implementation, reference can be made to step 102 described above. Details are omitted here for simplicity.

Step 204: The blockchain node processes the service data.
Step 205: The blockchain node broadcasts the service data to another blockchain node in a blockchain network.
Step 206: The blockchain node discards the service data.

Figure 3:
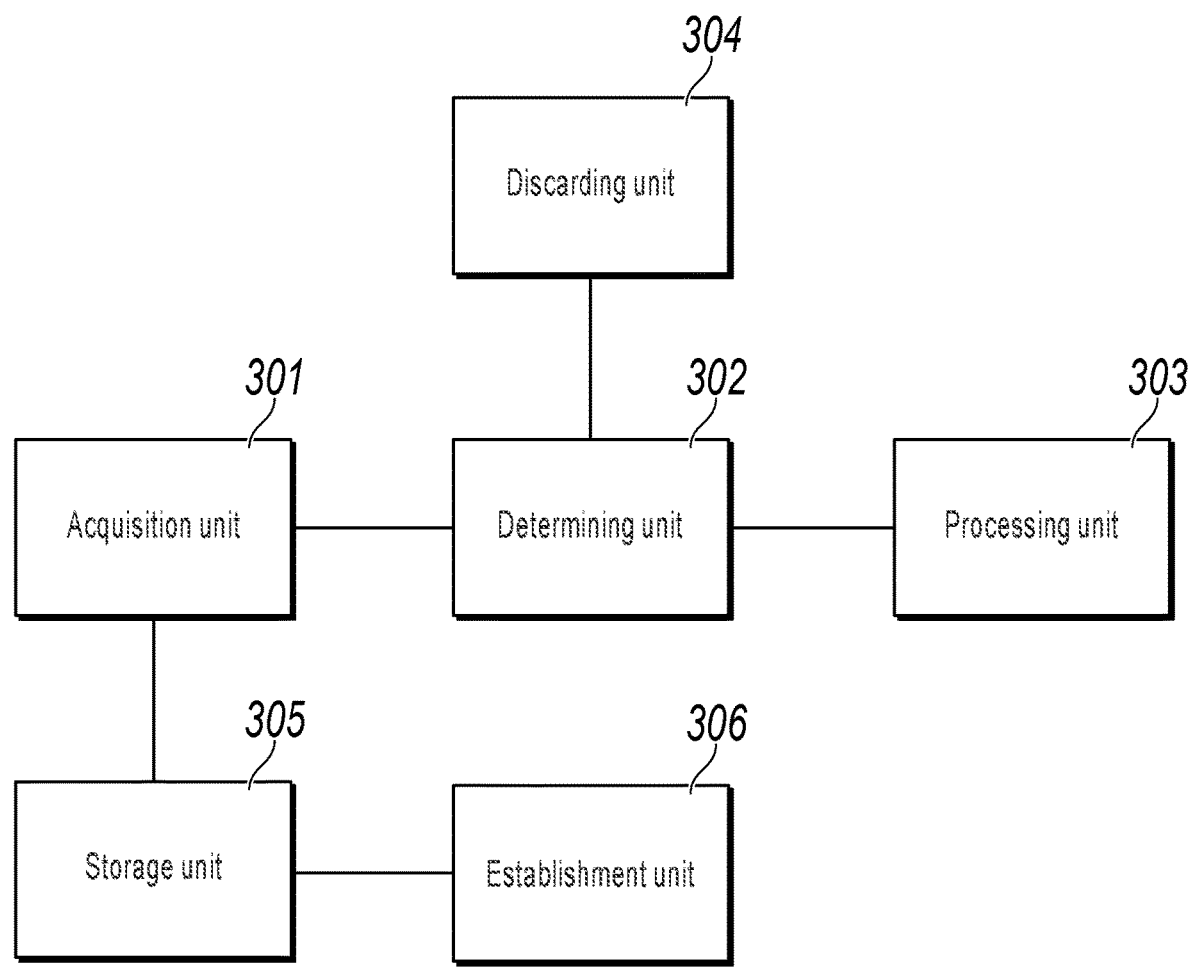
FIG. 3 is a schematic structural diagram illustrating a blockchain-based data processing device, according to an implementation of the present application.

Based on the same inventive concept, FIG. 3 is a schematic structural diagram illustrating a blockchain-based data processing device, according to an implementation of the present application. The data processing device includes an acquisition unit 301, a determining unit 302, and a processing unit 303.

The acquisition unit 301 is configured to obtain first service data, and determine an attribute value of the first service data, where the attribute value is used to represent uniqueness of the first service data.

The determining unit 302 is configured to determine, based on stored attribute values of second service data that has been processed and the attribute value of the first service data, whether the first service data has been processed.

The processing unit 303 is configured to process the first service data in response to determining that the first service data has not been processed.

In another implementation of the present application, the data processing device further includes a discarding unit 304.

The discarding unit 304 is configured to discard processing of the first service data in response to determining that the first service data has been processed.

In another implementation of the present application, that a determining unit 302 determines, based on stored attribute values of second service data that has been processed and the attribute value of the first service data, whether the first service data has been processed includes the following: querying, in the stored attribute values of the second service data that has been processed, for whether there is an attribute value that is the same as the attribute value of the first service data; and determining, based on a query result, whether the first service data has been processed.

In another implementation of the present application, that a processing unit 303 determines that the first service data has not been processed includes the following: determining that the first service data has not been processed in response to determining that no attribute value is found to be the same as the attribute value of the first service data from the stored attribute values of the second service data that has been processed.

In another implementation of the present application, the data processing device further includes a storage unit 305.

The storage unit 305 is configured to store the attribute value of the first service data.

In another implementation of the present application, the data processing device further includes an establishment unit 306.

The establishment unit 306 is configured to store the attribute value of the first service data in a processed database, where the processed database stores attribute values of service data that has been processed; and determine a query index of the attribute value of the first service data, and establish a mapping relationship between the query index and the attribute value of the first service data.

In another implementation of the present application, the attribute value is obtained when the service data is generated.

In another implementation of the present application, the attribute value includes one or more of a hash value of the service data and a serial number of the service data.

It is worthwhile to note that the data processing device provided in this implementation of the present application can be implemented by hardware, or can be implemented by software. This is not specifically limited here. According to the data processing device described in this implementation of the present application, an attribute value that can represent uniqueness of service data to be processed is compared with an attribute value, stored in a blockchain node, of service data that has been processed, to determine whether the service data to be processed has been processed; and when it is determined that the service data to be processed has not been processed, processing of the service data to be processed is started. Therefore, a replay attack can be effectively prevented. In addition, because attribute values of different service data are different, a problem that other service data cannot be processed due to the locking of one service data that is being processed can be avoided. Therefore, service data processing efficiency in a blockchain network is effectively ensured, and an overall service data throughput in the blockchain network is increased.

Based on the same inventive concept, an implementation of the present application further provides a data processing device, including at least one processor and a memory.

The memory is configured to store a program, so that the at least one processor performs the following steps: obtaining first service data, and determining an attribute value of the first service data, where the attribute value is used to represent uniqueness of the first service data; determining, based on stored attribute values of second service data that has been processed and the attribute value of the first service data, whether the first service data has been processed; and processing the first service data in response to determining that the first service data has not been processed.

Based on the same inventive concept, an implementation of the present application further provides a computer storage medium, including a program used in conjunction with a data processing device, where the program can be used by a processor to perform the following steps: obtaining first service data, and determining an attribute value of the first service data, where the attribute value is used to represent uniqueness of the first service data; determining, based on stored attribute values of second service data that has been processed and the attribute value of the first service data, whether the first service data has been processed; and processing the first service data in response to determining that the first service data has not been processed.

For specific implementations, reference can be made to the content of the previously described implementations. Details are omitted here for simplicity.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method procedures can be considered as direct improvement of a hardware circuit structure. Designers almost all program an improved method procedure to a hardware circuit, to obtain a corresponding hardware circuit structure. Therefore, it cannot be said that improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as ABEL (Advanced Boolean Expression Language), AHDL (Altera Hardware Description Language), Confluence, CUPL (Cornell University Programming Language), HDCal, JHDL (Java Hardware Description Language), Lava, a Lola, MyHDL, PALASM, and RHDL (Ruby Hardware Description Language), etc. Currently, VHDL (Very-High-Speed Integrated Circuit Hardware Description Language) and Verilog are most commonly used. A person skilled in the art should also understand that a method procedure only needs to be logically programmed, and programmed to the integrated circuit by using the previous hardware description languages so that a hardware circuit that implements the logical method procedure can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific method, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the other programmable device, generating computer-implemented processing. Therefore, the instructions executed on the computer or the other programmable device provide steps for implementing a specific function in one or more processes in the flowcharts or in one or more blocks in the block diagrams.

In a typical configuration, the computing device includes one or more processors (CPU), one or more input/output interfaces, one or more network interfaces, and one or more memories.

The memory can include a non-persistent memory, a random access memory (RAM) and/or a nonvolatile memory in a computer readable medium, for example, a read-only memory (ROM) or a flash memory (flash RAM). The memory is an example of a computer readable medium The computer readable medium includes persistent, non-persistent, movable, and unmovable media that can implement information storage by using any method or technology. Information can be a computer readable instruction, a data structure, a program module, or other data. A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. Based on the definition in the present specification, the computer readable medium does not include transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are all described in a progressive way. For the same or similar parts of the implementations, refer to the implementations. Each implementation focuses on a difference from other implementations. Particularly, a system implementation is basically similar to a method implementation, and therefore is described briefly. For related parts, refer to partial descriptions of the method implementation.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

What is claimed is:

1. A computer-implemented method, comprising:
    obtaining, by a blockchain node of a blockchain network, first service data;
    determining an attribute value of the first service data, wherein the attribute value is used to represent uniqueness of the first service data;
    determining, by the blockchain node and based on the attribute value of the first service data and stored attribute values of second service data that has been processed, whether the first service data has been processed, wherein determining whether the first service data has been processed comprises:
        querying, by the blockchain node and in the stored attribute values of the second service data that has been processed, whether there is a second attribute value that is identical to the attribute value of the first service data; and
        determining, by the blockchain node and based on a query result of the querying, whether the first service data has been processed;
    in response to determining that the first service data has not been processed, processing, by the blockchain node, the first service data, comprising:
        storing, by the blockchain node, the attribute value of the first service data in a database, wherein the database stores attribute values of service data that has been processed, and wherein the database is accessible by a plurality of blockchain nodes of the blockchain network;
    obtaining, by the blockchain node and from the database, a predetermined amount of service data comprising the first service data;
    triggering, by the blockchain node, a consensus processing on the predetermined amount of service data; and
    broadcasting, by the blockchain node, the first service data to at least one additional blockchain node of the blockchain network; and
    in response to determining that the first service data has been processed, discarding, by the blockchain node, the processing of the first service data, comprising discarding the consensus processing on the predetermined amount of service data comprising the first service data.

2. The computer-implemented method of claim 1, further comprising:
    in response to determining that the first service data has been processed:
        broadcasting, by the blockchain node, information that the first service data has been processed to the at least one additional blockchain node of the blockchain network, wherein the at least one additional blockchain node discards processing of the first service data upon receiving the information from the blockchain node, wherein the processing of the first service data comprises consensus processing of the first service data by the at least one additional blockchain node.

3. The computer-implemented method of claim 1, further comprising:
    in response to determining that no second attribute value is found to be identical to the attribute value of the first service data from the stored attribute values of the second service data that has been processed, determining, by the blockchain node, that the first service data has not been processed.

4. The computer-implemented method of claim 1, further comprising:
    determining, by the blockchain node, a query index of the attribute value of the first service data; and
    establishing a mapping relationship between the query index and the attribute value of the first service data.

5. The computer-implemented method of claim 1, wherein the attribute value comprises one or more of a hash value and a serial number of service data.

6. A non-transitory, computer-readable medium storing one or more instructions executable by a computer system to perform operations comprising:
    obtaining, by a blockchain node of a blockchain network, first service data;
    determining an attribute value of the first service data, wherein the attribute value is used to represent uniqueness of the first service data;
    determining, by the blockchain node and based on the attribute value of the first service data and stored attribute values of second service data that has been processed, whether the first service data has been processed, wherein determining whether the first service data has been processed comprises:
        querying, by the blockchain node and in the stored attribute values of the second service data that has been processed, whether there is a second attribute value that is identical to the attribute value of the first service data; and determining, by the blockchain node and based on a query result of the querying, whether the first service data has been processed;

in response to determining that the first service data has not been processed, processing, by the blockchain node, the first service data, comprising:

storing, by the blockchain node, the attribute value of the first service data in a database, wherein the database stores attribute values of service data that has been processed, and wherein the database is accessible by a plurality of blockchain nodes of the blockchain network;

obtaining, by the blockchain node and from the database, a predetermined amount of service data comprising the first service data;

triggering, by the blockchain node, a consensus processing on the predetermined amount of service data; and broadcasting, by the blockchain node, the first service data to at least one additional blockchain node of the blockchain network; and in response to determining that the first service data has been processed, discarding, by the blockchain node, the processing of the first service data, comprising discarding the consensus processing on the predetermined amount of service data comprising the first service data.

7. The non-transitory, computer-readable medium of claim 6, further comprising:

in response to determining that the first service data has been processed:

broadcasting, by the blockchain node, information that the first service data has been processed to the at least one additional blockchain node of the blockchain network, wherein the at least one additional blockchain node discards processing of the first service data upon receiving the information from the blockchain node, wherein the processing of the first service data comprises consensus processing of the first service data by the at least one additional blockchain node.

8. The non-transitory, computer-readable medium of claim 6, further comprising:

in response to determining that no second attribute value is found to be identical to the attribute value of the first service data from the stored attribute values of the second service data that has been processed, determining, by the blockchain node, that the first service data has not been processed.

9. The non-transitory, computer-readable medium of claim 6, further comprising:

determining, by the blockchain node, a query index of the attribute value of the first service data; and establishing a mapping relationship between the query index and the attribute value of the first service data.

10. The non-transitory, computer-readable medium of claim 6, wherein the attribute value comprises one or more of a hash value and a serial number of service data.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, by a blockchain node of a blockchain network, first service data;

determining an attribute value of the first service data, wherein the attribute value is used to represent uniqueness of the first service data;

determining, by the blockchain node and based on the attribute value of the first service data and stored attribute values of second service data that has been processed, whether the first service data has been processed, wherein determining whether the first service data has been processed comprises:

querying, by the blockchain node and in the stored attribute values of the second service data that has been processed, whether there is a second attribute value that is identical to the attribute value of the first service data; and determining, by the blockchain node and based on a query result of the querying, whether the first service data has been processed;

in response to determining that the first service data has not been processed, processing, by the blockchain node, the first service data, comprising:

storing, by the blockchain node, the attribute value of the first service data in a database, wherein the database stores attribute values of service data that has been processed, and wherein the database is accessible by a plurality of blockchain nodes of the blockchain network;

obtaining, by the blockchain node and from the database, a predetermined amount of service data comprising the first service data;

triggering, by the blockchain node, a consensus processing on the predetermined amount of service data; and broadcasting, by the blockchain node, the first service data to at least one additional blockchain node of the blockchain network; and in response to determining that the first service data has been processed, discarding, by the blockchain node, the processing of the first service data, comprising discarding the consensus processing on the predetermined amount of service data comprising the first service data.

12. The computer-implemented system of claim 11, further comprising:

in response to determining that the first service data has been processed:

broadcasting, by the blockchain node, information that the first service data has been processed to the at least one additional blockchain node of the blockchain network, wherein the at least one additional blockchain node discards processing of the first service data upon receiving the information from the blockchain node, wherein the processing of the first service data comprises consensus processing of the first service data by the at least one additional blockchain node.

13. The computer-implemented system of claim 11, further comprising:

in response to determining that no second attribute value is found to be identical to the attribute value of the first service data from the stored attribute values of the second service data that has been processed, determining, by the blockchain node, that the first service data has not been processed.

14. The computer-implemented system of claim 11, further comprising:

determining, by the blockchain node, a query index of the attribute value of the first service data; and establishing a mapping relationship between the query index and the attribute value of the first service data.

15. The computer-implemented system of claim 11, wherein the attribute value comprises one or more of a hash value and a serial number of service data.

* * * * *